US012774242B2

(12) United States Patent
Wada et al.

(10) Patent No.: US 12,774,242 B2
(45) Date of Patent: Oct. 27, 2026

(54) LOW-MELTING-POINT GLASS

(71) Applicant: AGC Inc., Tokyo (JP)

(72) Inventors: Naoya Wada, Tokyo (JP); Satoru Tomeno, Tokyo (JP); Misa Inamoto, Tokyo (JP)

(73) Assignee: AGC Inc., Tokyo (JP)

(*) Notice: Subject to any disclaimer, the term of this patent is extended or adjusted under 35 U.S.C. 154(b) by 883 days.

(21) Appl. No.: 18/173,173

(22) Filed: Feb. 23, 2023

(65) Prior Publication Data

US 2023/0202908 A1 Jun. 29, 2023

Related U.S. Application Data

(63) Continuation of application No. PCT/JP2021/031794, filed on Aug. 30, 2021.

(30) Foreign Application Priority Data

Sep. 4, 2020 (JP) ................................ 2020-149137

(51) Int. Cl.

| | |
|---|---|
| ***C03C 3/247*** | (2006.01) |
| ***B32B 17/10*** | (2006.01) |
| ***B32B 27/36*** | (2006.01) |
| ***C01B 25/455*** | (2006.01) |
| ***C08K 3/40*** | (2006.01) |

(52) U.S. Cl.

CPC .............. *C03C 3/247* (2013.01); *B32B 17/10* (2013.01); *B32B 27/36* (2013.01); *C01B 25/455* (2013.01); *C08K 3/40* (2013.01); *B32B 2250/40* (2013.01); *B32B 2315/08* (2013.01); *B32B 2367/00* (2013.01); *C01P 2002/02* (2013.01)

(58) Field of Classification Search

CPC ...................................................... C03C 3/247

See application file for complete search history.

(56) References Cited

U.S. PATENT DOCUMENTS

| | | | | |
|---|---|---|---|---|
| 5,089,446 A * | 2/1992 | Cornelius | C03C 8/24 501/15 | |
| 5,179,046 A * | 1/1993 | Francis | C03C 8/24 501/15 | |
| 7,323,160 B2 * | 1/2008 | Algar | C03C 4/0021 106/35 | |
| 7,615,506 B2 * | 11/2009 | Aitken | C03C 8/24 501/15 | |
| 2008/0146431 A1 * | 6/2008 | Aitken | C03C 8/24 501/44 | |

FOREIGN PATENT DOCUMENTS

JP 2010-505727 A 2/2010

OTHER PUBLICATIONS

International Search Report issued Nov. 2, 2021, in PCT/JP2021/031794 filed on Aug. 30, 2021, 3 pages.

* cited by examiner

*Primary Examiner* — Noah S Wiese

(74) *Attorney, Agent, or Firm* — Oblon, McClelland, Maier & Neustadt, L.L.P.

(57) ABSTRACT

The invention relates to a glass including, as represented by mol % based on elements: 8-25% of P; 8-40% of Sn; 20-80% of O; and 1-50% of F, in which the glass has a glass transition temperature Tg of 300° C. or lower, and the glass gives an infrared absorption spectrum satisfying A3240/A3100 of 0.6-1.2, where the A3100 is an absorbance per 1-mm thickness at a wavenumber of 3,100 $cm^{-1}$ and the A3240 is an absorbance per 1-mm thickness at a wavenumber of 3,240 $cm^{-1}$.

19 Claims, 5 Drawing Sheets

LOW-MELTING-POINT GLASS

CROSS-REFERENCE TO RELATED APPLICATIONS

This is a bypass continuation of International Patent Application No. PCT/JP2021/031794, filed on Aug. 30, 2021, which claims priority to Japanese Patent Application No. 2020-149137, filed on Sep. 4, 2020. The contents of these applications are hereby incorporated by reference in their entireties.

TECHNICAL FIELD

The present invention relates to a glass, particularly, a glass that has a low glass transition point (Tg) to be moldable at low temperatures and which can be inhibited from foaming or crystallizing when molded. The present invention further relates to a composite member obtained by combining the glass with a resin and to a molded object thereof.

BACKGROUND ART

Organic polymers (resins) have low molding temperatures and are inexpensive, and are hence used in various applications, although the organic polymers are inferior to glasses in heat resistance, light resistance, transparency to light, and gas barrier property. Meanwhile, although glasses are superior in heat resistance, light resistance, transparency to light, and gas barrier property, ordinary glasses are high in Tg and difficult to be molded at will.

A low-melting-point glass is a glass material having a lower melting temperature than the ordinary glasses, and such low-melting-point glasses are utilized for coating or bonding metal surfaces or glass surfaces, or utilized as an encapsulating material for electronic products which is required to attain higher hermetic properties than resinous materials (for example, Patent Literature 1).

Patent Literature 1: JP2010-505727A

SUMMARY OF INVENTION

However, the conventional low-melting-point glasses have problems that they are prone to crystallize or foam and are hence less apt to be transparent after low-temperature molding and that they have a narrow molding-temperature margin due to the crystallization. Because of this, the conventional low-melting-point glasses are unsuitable for use as materials for low-temperature molding processes such as extrusion, injection, blow, and press molding to be generally used for molding resins.

An object of the present invention hence is to provide a glass that has a low Tg to be moldable at low temperatures and is inhibited from foaming or crystallizing when molded.

The present inventors made investigations on those problems and, as a result, have discovered that the problems can be overcome by controlling a structure lying around OH groups in a glass. The present invention has been thus completed.

The present invention relates to a glass including, as represented by mol % based on elements, 8-25% of P, 8-40% of Sn, 20-80% of O, and 1-50% of F, the glass having a glass transition temperature Tg of 300° C. or lower, and the glass giving an infrared absorption spectrum satisfying A3240/A3100 of 0.6-1.2, where the A3100 is an absorbance per 1-mm thickness at a wavenumber of 3,100 $cm^{-1}$ and the A3240 is an absorbance per 1-mm thickness at a wavenumber of 3,240 $cm^{-1}$.

The glass of the present invention not only has a Tg of 300° C. or lower and excellent moldability but also gives an infrared absorption spectrum in which A3240/A3100 is in the specific range, where the A3100 is an absorbance per 1-mm thickness at a wavenumber of 3,100 $cm^{-1}$ and the A3240 is an absorbance per 1-mm thickness at a wavenumber of 3,240 $cm^{-1}$. The glass of the present invention has a controlled structure around the OH groups thereof and is hence inhibited from crystallizing or foaming. Due to this, the glass of the present invention has an advantage that the glass shows excellent transparency after low-temperature molding.

BRIEF DESCRIPTION OF DRAWINGS

Each of FIG. 1A

Figure 2:
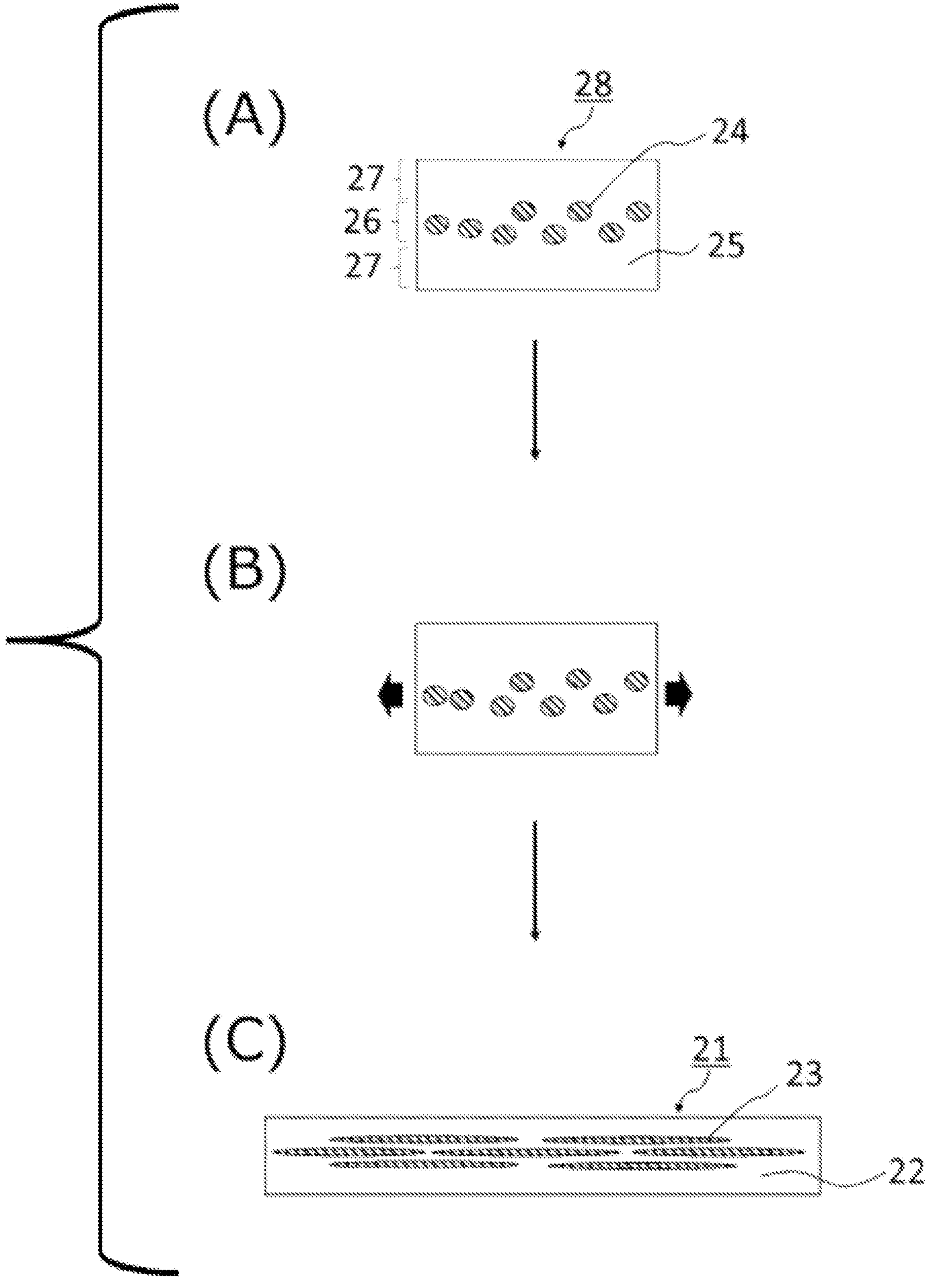

Each of (A) to (C) of FIG. 2 is a schematic view illustrating an embodiment of processes for producing a glass-resin sea-island composite.

Figure 3:
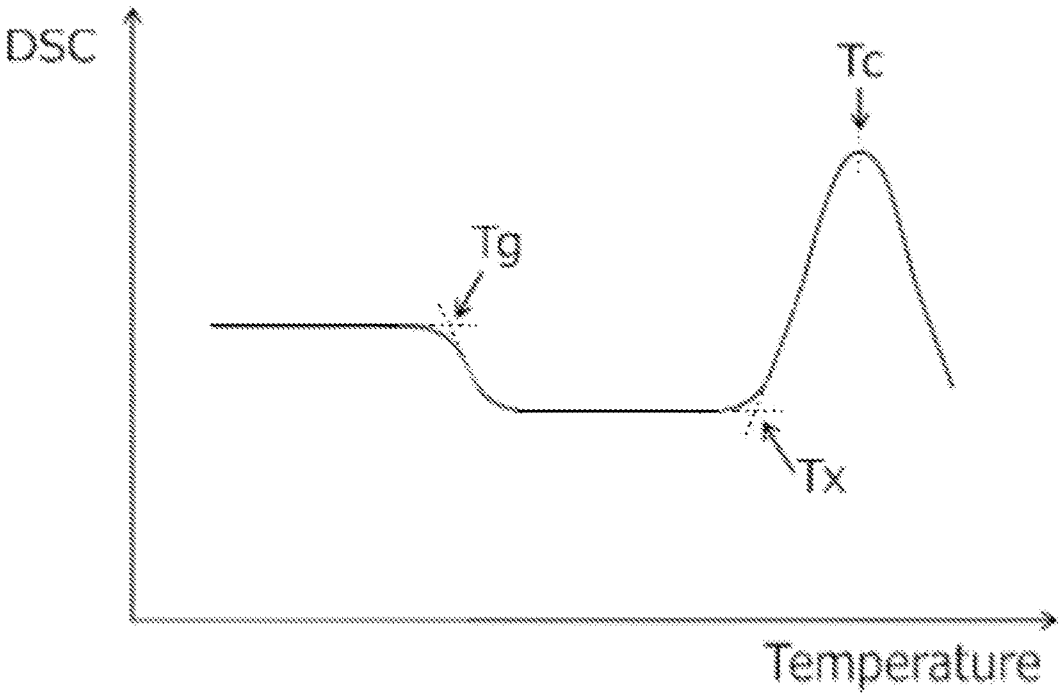

FIG. 3 shows a DSC curve.

Figure 4:
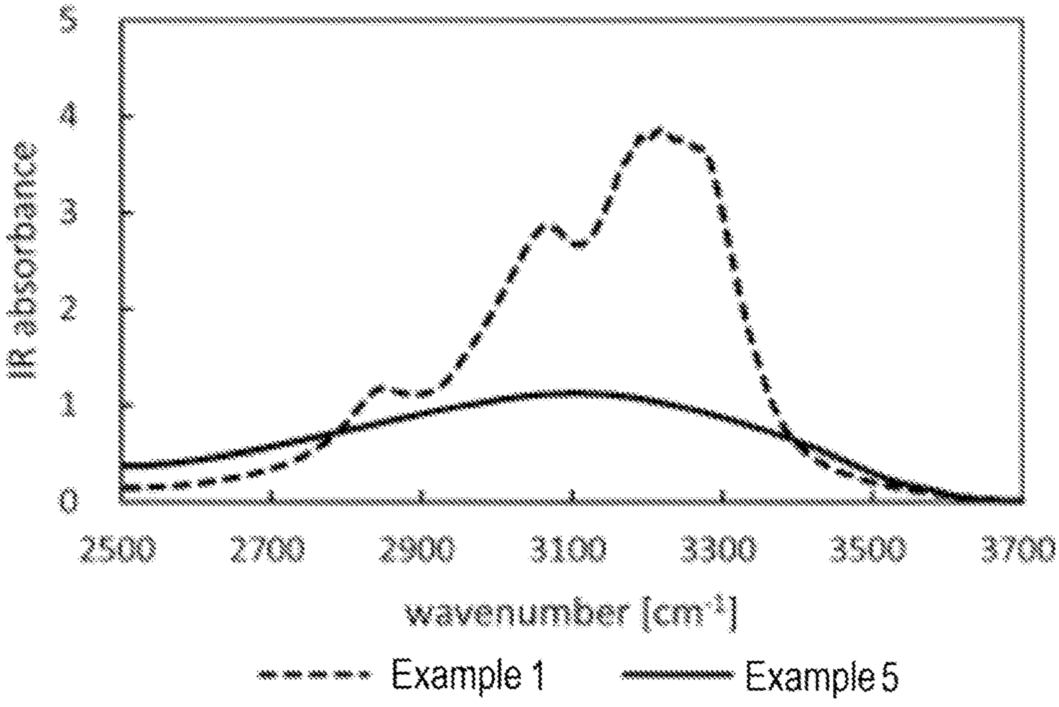

FIG. 4 is a diagram showing examples of results of an examination for infrared absorption spectrum.

Figure 5:
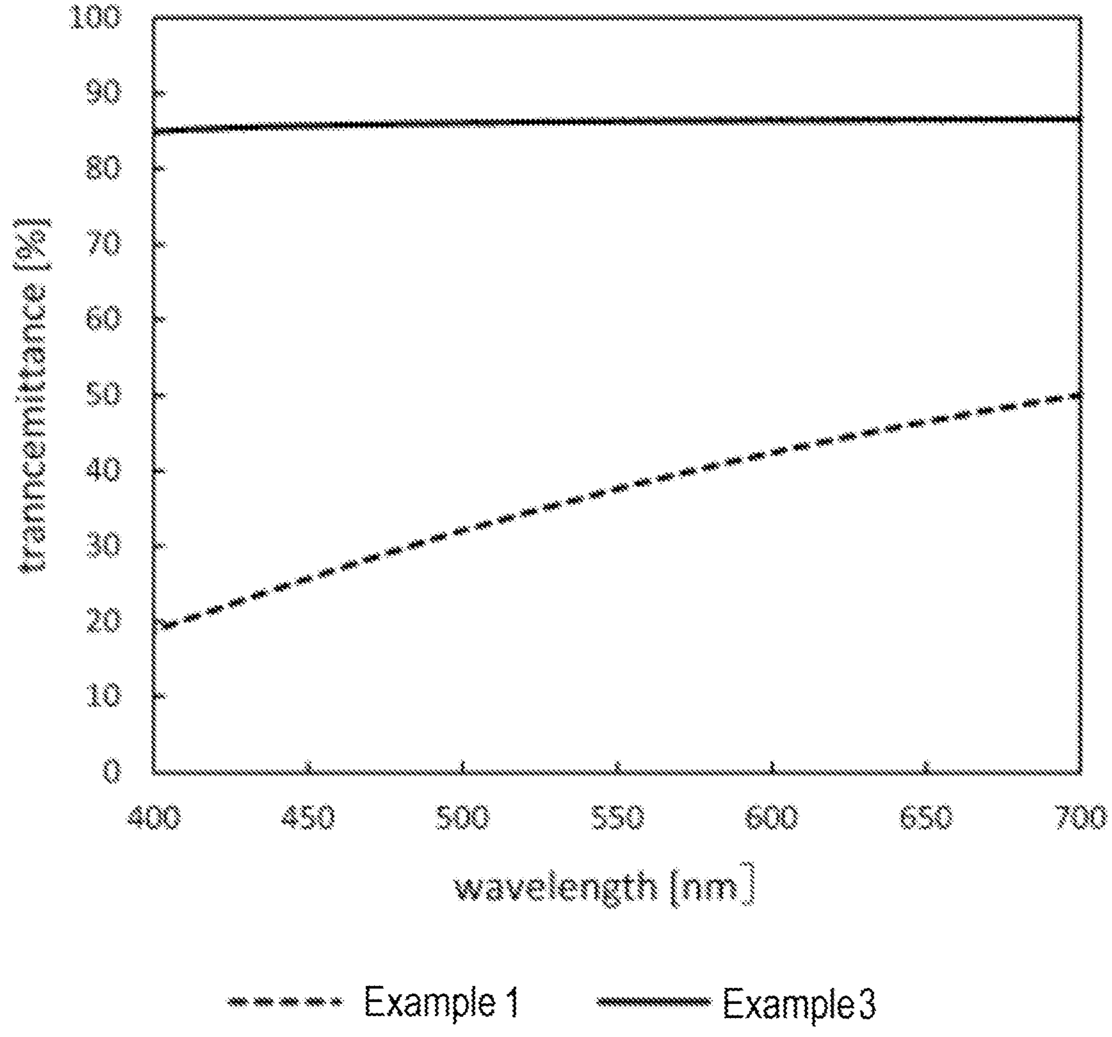

FIG. 5 is a diagram showing examples of results of an examination for parallel-light transmittance.

DESCRIPTION OF EMBODIMENTS

In this specification, the symbol "-" or the word "to" that is used to express a numerical range includes the numerical values before and after the symbol or the word as the upper limit and the lower limit of the range, respectively. Unless otherwise indicated, the symbol "-" or the word "to" has the same meaning herein.

In this specification, "mol %" for showing glass compositions is expressed simply by "%" unless otherwise indicated.

In this specification, the expression "containing substantially no X" means that the content of X is not higher than the level for impurities contained in starting materials, etc., namely, X is not one added purposely. In the case where there is a statement herein that a component is not substantially contained, the content of this component is specifically, for example, less than 0.1%.

In this specification, "parallel-light transmittance" is the proportion of a parallel light beam passing through a sample to a parallel light beam that entering the sample, and any scatted light is not included. The term "haze ratio" means a value measured in accordance with JIS K3761:2000 using the illuminant C.

<Glass>

(Composition)

The glass of the present invention includes, as represented by mol % based on elements, 8-25% of P;

8-40% of Sn;

20-80% of O; and 1-50% of F.

The content ranges are explained below.

The content of P is 8% or higher, and is preferably 10% or higher, more preferably 12% or higher. By regulating the content of P to 8% or higher, the glass can be made to have a lowered glass transition temperature Tg and a lowered molding temperature. The content of P is 25% or less, and is preferably 20% or less, more preferably 17% or less. By regulating the content of P to 25% or less, the glass can be made to have improved water resistance and gas barrier property.

The content of Sn is 8% or higher, and is preferably 10% or higher, more preferably 13% or higher. By regulating the content of Sn to 8% or higher, the glass can be made to have improved water resistance and gas barrier property. The content of Sn is 40% or less, and is preferably 30% or less, more preferably 20% or less. By regulating the content of Sn to 40% or less, the glass can be made to have a lowered glass transition temperature Tg and a lowered molding temperature.

The proportion of the content of Sn to the content of P, i.e., Sn/P, is preferably 0.3-3. By regulating Sn/P to 0.3-3, the content of F remaining after melting and after low-temperature molding can be increased and crystallization during low-temperature molding can be inhibited. Sn/P is preferably 0.3-3, more preferably 0.5-2.5, still more preferably 0.7-2.

The content of O is 20% or higher, and is preferably 30% or higher, more preferably 40% or higher. By regulating the content of O to 20% or higher, glass production steps can be simplified. The content of O is 80% or less, and is preferably 70% or less, more preferably 60% or less. By regulating the content of O to 80% or less, the glass can be made to have a lowered glass transition temperature Tg and a lowered molding temperature.

The content of F is 1% or higher, and is preferably 3% or higher, more preferably 10% or higher, still more preferably 15% or higher. By regulating the content of F to 1% or higher, the glass can be made to have a lowered glass transition temperature Tg and a lowered molding temperature and can be inhibited from crystallizing. The content of F is 50% or less, and is preferably 40% or less, more preferably 35% or less, still more preferably 30% or less. By regulating the content of F to 50% or less, not only glass production steps can be simplified but also the glass can be inhibited from evolving an HF gas during melting or low-temperature molding. Here, the content of F is a value obtained not from feed amounts in preparation of raw materials for glass but by analyzing the glass by an ion selective electrode method or ion chromatography. The contents of the elements other than F and O are values obtained by ICP emission spectrophotometry. The content of O is calculated from a difference between the total concentration of the other elements and the whole.

Any desired compounds and additives used in glasses may be added, besides the components described above, into the glass of the present invention so long as the contents of those components are within those ranges and the effects of the present invention are produced. For example, the glass may contain the following components.

The glass of the present invention may contain Zn in an amount of 0-30%. The inclusion of Zn enables the glass to be inhibited from crystallizing and have a reduced coefficient of thermal expansion, while retaining a low glass transition temperature Tg. The content of Zn may be 5% or higher, or may be 10% or higher. The content of Zn may be 25% or less, or may be 20% or less.

The glass of the present invention may contain Ba in an amount of 0-30%. The inclusion of Ba enables the glass to be inhibited from crystallizing and have improved water resistance, while retaining a low glass transition temperature Tg. The content of Ba may be 5% or higher, or may be 10% or higher. The content of Ba may be 25% or less, or may be 20% or less.

The glass of the present invention may contain Mg, Ca, and Sr in a total amount of 0-30%. The inclusion of Mg, Ca, and Sr can improve the water resistance. The total content of Mg, Ca, and Sr may be 7% or higher, or may be 15% or higher. The total content of Mg, Ca, and Sr may be 25% or less, or may be 20% or less.

The glass of the present invention may contain Li, Na, and K in a total amount of 0-30%. The inclusion of Li, Na, and K can lower the glass transition temperature Tg and the molding temperature. The total content of Li, Na, and K may be 5% or higher, or may be 10% or higher. The total content of Li, Na, and K may be 25% or less, or may be 20% or less.

The glass of the present invention may contain Al in an amount of 0-20%. The inclusion of Al can improve the water resistance and the gas barrier property. The content of Al may be 3% or higher, or may be 6% or higher. The content of Al may be 15% or less, or may be 10% or less.

The glass of the present invention may contain B in an amount of 0-20%. The inclusion of B can inhibit crystallization and improve the chemical resistance. The content of B may be 5% or higher, or may be 10% or higher. The content of B may be 17% or less, or may be 13% or less.

The glass of the present invention may contain Si in an amount of 0-10%. The inclusion of Si can inhibit crystallization and improve the water resistance and the chemical resistance. The content of Si may be 2% or higher, or may be 5% or higher. The content of Si may be 8% or less, or may be 7% or less.

The glass of the present invention may contain Zr in an amount of 0-10%. The inclusion of Zr can inhibit crystallization and improve the water resistance and the chemical resistance. The content of Zr may be 2% or higher, or may be 4% or higher. The content of Zr may be 8% or less, or may be 6% or less.

The glass of the present invention may contain Ce and Y in a total amount of 0-10%. The inclusion of Ce and Y can improve the water resistance and the chemical resistance. The total content of Ce and Y may be 2% or higher, or may be 4% or higher. The total content of Ce and Y may be 8% or less, or may be 6% or less.

The glass of the present invention may contain Nb, W, Mo, and Ta in a total amount of 0-20%. The inclusion of Nb, W, Mo, and Ta can improve the water resistance and the chemical resistance. However, care should be taken not to cause crystallization or coloring. The total content of Nb, W, Mo, and Ta may be 2% or higher, or may be 4% or higher. The total content of Nb, W, Mo, and Ta may be 15% or less, or may be 10% or less.

The glass of the present invention may contain Fe, Ti, Mn, Cr, Cu, and Ag in a total amount of 0-20%. The inclusion of Fe, Ti, Mn, Cr, Cu, and Ag can inhibit crystallization and lower the glass transition temperature Tg. However, care should be taken not to cause crystallization or coloring. The total content of Fe, Ti, Mn, Cr, Cu, and Ag may be 2% or higher, or may be 4% or higher. The total content of Fe, Ti, Mn, Cr, Cu, and Ag may be 15% or less, or may be 10% or less.

The glass of the present invention may contain Cl, Br, I, and S in a total amount of 0-20%. The inclusion of Cl, Br, I, and S can inhibit crystallization. The total content of Cl, Br, I, and S may be 3% or higher, or may be 7% or higher. The total content of Cl, Br, I, and S may be 17% or less, or may be 13% or less.

(Glass Transition Temperature Tg)

The glass of the present invention has a glass transition temperature Tg of 300° C. or lower, preferably 200° C. or lower, more preferably 150° C. or lower, still more preferably 100° C. or lower. There is no particular lower limit on the Tg. However, from the standpoint of improving the weatherability and water resistance, the Tg thereof is preferably 50° C. or higher, more preferably 70° C. or higher, still more preferably 80° C. or higher. In the case where the glass transition temperature thereof is 300° C. or lower, the glass has a low melting point and can be used as a material for low-temperature molding processes such as extrusion, injection, blow, and press molding to be generally used for molding resins.

(Infrared Absorption Spectrum)

The glass of the present invention gives an infrared absorption spectrum satisfying A3240/A3100 of 1.2 or less, preferably 1 or less, more preferably 0.9 or less, where the A3100 is an absorbance per 1-mm thickness at a wavenumber of 3,100 $cm^{-1}$ and the A3240 is an absorbance per 1-mm thickness at a wavenumber of 3,240 $cm^{-1}$. In the case where A3240/A3100 is 1.2 or less, the structure around OH groups can be suitably controlled and the glass can hence be inhibited from crystallizing or foaming. Consequently, a transparent molded object is obtained. A3240/A3100 is 0.6 or larger, and is preferably 0.7 or larger, more preferably 0.8 or larger. In the case where A3240/A3100 is 0.6 or larger, glass production steps can be simplified.

The infrared absorption spectra at around wavenumbers of 3,100 $cm^{-1}$ and 3,240 $cm^{-1}$ are derived from the OH groups present in the glass, but are changed in shape by the influence of the framework structure of the glass. In the case where the framework structure of the glass is a P—O—Sn—O structure, this glass, when molded at low temperatures, is apt to undergo rearrangement of elements with the vaporization of F and OH attached to the glass framework and crystals of a tin phosphate compound are prone to be yielded. In the case where the framework structure of the glass is a P—O—Sn—O structure, the peak of A3240 in the infrared absorption spectrum is prone to protrude to make A3240/A3100 larger than 1.2. By making the framework structure of the glass be preferably a P—O—P—O structure, A3240/A3100 can be 0.6-1.2. The F and OH attached to the P—O—P—O structure are less apt to vaporize during low-temperature molding. Even if the F and OH vaporize, crystallization due to element rearrangement is less apt to occur. In addition, since the vaporization of F and OH can be inhibited, the glass is less apt to foam.

In the case where the content of ammonium dihydrogen phosphate ($NH_4H_2PO_4$) is 51% or larger in terms of weight ratio to the total weight of phosphoric-acid-salt raw materials for the glass, the framework structure of the glass is a P—O—Sn—O structure and this glass is prone to yield crystals of a tin phosphate compound and has a value of A3240/A3100 larger than 1.2. Furthermore, use of ammonium dihydrogen phosphate is undesirable because not only an ammonia gas is evolved in a large amount during melting of the glass, imposing a heavy environmental burden, but also foaming due to an ammonia gas occurs also during low-temperature molding. Meanwhile, in the case where the content of orthophosphoric acid ($H_3PO_4$) is 51% or larger in terms of weight ratio to the total weight of phosphoric-acid-salt raw materials for the glass, the framework structure of the glass is a P—O—P—O structure and this glass not only is less apt to crystallize or foam and has excellent transparency after melting and low-temperature molding but also has a value of A3240/A3100 of 0.6-1.2. In addition, water contained in orthophosphoric acid serves in the glass to inhibit crystallization during low-temperature molding. It is hence preferred to use orthophosphoric acid as a phosphoric-acid-salt raw material for the glass.

The weight ratio of orthophosphoric acid ($H_3PO_4$) to the total weight of phosphoric-acid-salt raw materials for the glass is preferably 70% or higher, more preferably 80% or higher, still more preferably 90% or higher. Other phosphoric-acid-salt raw materials such as ammonium hexafluorophosphate ($NH_4PF_6$), stannous pyrophosphate ($Sn_2P_2O_7$), diphosphorus pentaoxide ($P_2O_5$), tristannous bisorthophosphate ($Sn_3(PO_4)_2$), zinc pyrophosphate ($Zn_2P_2O_7$), and aluminum phosphate ($AlPO_4$) can also be used. However, the phosphoric-acid-salt raw materials are not limited to those examples. As the orthophosphoric acid ($H_3PO_4$), it is preferred to use a chemical having a concentration of 75-90%. For calculating a weight ratio, the weight of the whole chemical is used.

The glass of the present invention preferably has the following absorbance values in an infrared absorption spectrum. The absorbance thereof per 1-mm thickness at a wavenumber of 3,100 $cm^{-1}$ is preferably 0.2-4, more preferably 0.3-3, still more preferably 0.5-2. The absorbance thereof per 1-mm thickness at a wavenumber of 3,240 $cm^{-1}$ is preferably 0.12-4.8, more preferably 0.18-3.6, still more preferably 0.3-2.4. In the case where the absorbance per 1-mm thickness at a wavenumber of 3,100 $cm^{-1}$ and the absorbance per 1-mm thickness at a wavenumber of 3,240 $cm^{-1}$ are within those ranges, the glass has a controlled structure and is less apt to crystallize or foam when molded at low temperatures. Consequently, molded objects having excellent transparency are obtained.

The infrared absorption spectrum is determined using a Fourier transform infrared spectrophotometer. In the case where the transmittance at a wavenumber of 400 $cm^{-1}$ is expressed by T400, the transmittance at a wavenumber of 3,100 $cm^{-1}$ is expressed by T3100, the transmittance at a wavenumber of 3,240 $cm^{-1}$ is expressed by T3240, and the test sample has a thickness of D (mm), then the absorbance A3100 per 1-mm thickness at a wavenumber of 3,100 $cm^{-1}$ is calculated by $A3100=-\log_{10}(T3100/T400)/D$ and the absorbance A3240 per 1-mm thickness at a wavenumber of 3,240 $cm^{-1}$ is calculated by $A3240=-\log_{10}(T3240/T400)/D$. The dividing by T400 is for correcting the base line in the determination. The test sample is preferably processed into a flat plate having a thickness of 1 mm using free abrasive grains of cerium oxide as a finishing material.

(Raman Scattering Spectrum)

The glass of the present invention preferably gives a Raman scattering spectrum in which a main peak is observed in a range of 1,020-1,060 $cm^{-1}$. This main peak is derived from a $Q^1$ structure of P, which contributes to the stability of the glass. Furthermore, in the Raman scattering spectrum of the glass of the present invention, a peak is preferably observed in a range of 960-1,000 $cm^{-1}$. This peak is derived from a $Q^0$ structure of P, which contributes to an improvement in the water resistance of the glass. Furthermore, in the Raman scattering spectrum of the glass of the present invention, no peak is preferably observed in a range of 1,080-1,170 $cm^{-1}$. This peak is derived from a $Q^2$ structure of P, which impairs the water resistance of the glass.

(Differential Scanning Calorimetry)

In the glass of the present invention, the difference between a crystallization peak temperature Tc thereof determined by differential scanning calorimetry and the glass transition temperature Tg thereof is preferably 150° C. or larger, more preferably 160° C. or larger, still more preferably 170° C. or larger. It is most preferable that no Tc be observed, and in this case, the difference between the Tc and the Tg can be regarded as infinity. In the case where the difference between the Tc and the Tg is 150° C. or larger, it is possible to increase the difference between the temperature at which the glass becomes moldable and the crystallization temperature, i.e., to widen the molding-temperature margin. Thus, a glass having better transparency is obtained after low-temperature molding. Incidentally, at temperatures of Tc and higher, the glass abruptly increases in viscosity due to crystallization thereof and is hence difficult to be molded at low temperatures.

In the glass of the present invention, the difference between a crystallization initiation temperature Tx thereof determined by differential scanning calorimetry and the glass transition temperature Tg thereof is preferably 140° C. or larger, more preferably 150° C. or larger, still more preferably 160° C. or larger. It is most preferable that no Tx be observed, and in this case, the difference between the Tx and the Tg can be regarded as infinity. In the case where the difference between the Tx and the Tg is 140° C. or larger, it is possible to increase the difference between the temperature at which the glass becomes moldable and the temperature at which crystallization begins. Thus, a glass having better transparency is obtained after low-temperature molding.

In an examination by differential scanning calorimetry, a powder having a median diameter less than 3 μm obtained by pulverization with an agate mortar is used as a sample to be examined, and the sample is examined in the air atmosphere under such conditions that the sample is heated from 25° C. to 500° C. at 2° C./min. As shown in FIG. 3, in a DSC curve, the Tg is a temperature at which the curve undergoes an endothermic shift first in the course of heating, the Tx is a temperature at which heat generation due to crystallization begins first in the course of heating, and the Tc is a temperature corresponding to a peak of the heat generation due to crystallization occurring first in the course of heating.

(Weight Change During Molding)

The glass of the present invention has a weight change through a 1-hour heat treatment at (Tg+150)° C. of preferably −2% or larger, more preferably −1% or larger, still more preferably −0.7% or larger. (Tg+150)° C. is equal to a temperature to be used for low-temperature molding. In the case where the weight change is −2% or larger, the glass does not have too high a water content and is inhibited from foaming during low-temperature molding, and molded objects having excellent transparency are obtained. An upper limit of the weight change is preferably +0.5% or less, more preferably −0.1% or less, still more preferably −0.3% or less. In the case where the weight change is +0.5% or less, the presence of water in the glass inhibits the glass from crystallizing during low-temperature molding, thereby giving molded objects having excellent transparency.

The weight change through a 1-hour heat treatment at (Tg+150)° C. is determined under the following conditions.

The weight of a sample is measured with a thermogravimetric differential thermal analyzer. As the sample to be examined, use is made of a powder having a median diameter less than 3 μm obtained by pulverization with an agate mortar. The sample is examined under such conditions that the sample is heated in the air atmosphere from 25° C. to (Tg+150)° C. at 2° C./min and then held at (Tg+150)° C. for 1 hour. The sample is evaluated for the ratio of the resultant weight change with respect to the initial weight.

(Parallel-Light Transmittance)

The glass of the present invention, when examined with a 1-mm-thick flat plate along the thickness direction, has an average value of preferably 70% or higher, more preferably 80% or higher, still more preferably 85% or higher, in parallel-light transmittance in a wavelength of 400-700 nm. In the case where the average value thereof is 70% or higher, the glass has excellent transparency and is inhibited from crystallizing. Furthermore, by subjecting the glass in which the average value is 70% or higher to low-temperature molding, molded objects having high transparency can be obtained. Although there is no particular upper limit on the average value, the average value is typically 92% or less. The sample to be examined is preferably processed into a flat plate having a thickness of 1 mm using free abrasive grains of cerium oxide as a finishing material.

(Haze Ratio)

The glass of the present invention, when examined with a 1-mm-thick flat plate along the thickness direction, has a haze ratio of preferably 20% or less, more preferably 15% or less, still more preferably 10% or less. In the case where the haze ratio is 20% or less, the glass has excellent transparency and is inhibited from crystallizing. Although there is no particular lower limit on the haze ratio, the haze ratio of the glass is typically 0.2% or higher. The sample to be examined is preferably processed into a flat plate having a thickness of 1 mm using free abrasive grains of cerium oxide as a finishing material.

(Production Method)

The glass of the present invention can be produced by a method in which raw materials for the glass are prepared, melted, and cooled. In producing the glass of the present invention, it is preferred to use orthophosphoric acid ($H_3PO_4$) as a phosphoric-acid-salt raw material for the glass. Orthophosphoric acid contains water and may hence be used after having been dried at a temperature of 100-500° C. for about 10 minutes to 50 hours prior to the melting. Either orthophosphoric acid alone may be dried before being mixed with the other raw materials, or orthophosphoric acid may be mixed with some or all of the other raw materials before being dried. The melting is conducted by putting the raw materials in a vessel made of platinum, carbon, quartz, alumina, nickel, etc., and holding the contents at a temperature of 400-700° C. for about 10 minutes to 10 hours. All of the raw materials may be melted together, or some or specific raw materials only may be melted first and then the remainder may be melted. According to need, the molten glass may be molded into a given shape, e.g., pellets or flakes, by any of various methods.

<Glass Pellet>

The glass of the present invention may be a glass pellet having a shape of a pellet. The shape of the pellet makes the glass easy to be introduced into a low-temperature molding machine. The glass pellet has a major-axis length of preferably 0.1-5 mm, more preferably 1-4.5 mm, still more preferably 2-4 mm. The glass pellet has a minor-axis length of preferably 0.1-5 mm, more preferably 0.5-4.5 mm, still more preferably 1.5-4 mm. In the case where the glass pellet is too small, this can cause problems that the glass pellet is clogged in the molding machine, the glass is prone to crystallize during low-temperature molding, and bubbles are apt to be trapped during low-temperature molding. Meanwhile, in the case where the glass pellet is too large, this can cause problems that the glass pellet is not conveyed by the screw in the molding machine and the glass pellet is prone to be damaged. The ratio between the major-axis length and minor-axis length of the glass pellet is preferably 0.2-1, more preferably 0.5-1, still more preferably 0.7-1, from the standpoint of avoiding damage in the molding machine.

Methods for producing the glass pellet are not particularly limited. Examples thereof include: a method in which the glass is pressed using a mold; a method in which the glass is crushed with water; a method in which the glass is molded by dripping; a method in which a glass powder is remelt; and a method in which the melt is torn to small pieces and then flung away.

(Low-Temperature Molding)

The glass of the present invention is preferably used in at least one of extrusion molding, injection molding, blow molding, and press molding, performed at preferably 450° C. or lower, more preferably 350° C. or lower, still more preferably 300° C. or lower. Incidentally, the press molding includes rolling-out molding. Since the glass of the present invention has a Tg of 300° C. or lower and A3240/A3100 of 1.2 or less as stated above, this glass, even when used in low-temperature molding processes performed preferably at 450° C. or lower, is inhibited from crystallizing or foaming and molded objects having excellent transparency are obtained. From the standpoint of further inhibiting foaming, the glass may be dried before low-temperature molding. Drying conditions typically include drying at a temperature around the Tg for 10 minutes to 10 hours.

<<Glass-Resin-Composite Pellet>>

The glass pellet may be a glass-resin-composite pellet obtained by combining the glass of the present invention with a resin. As the resin, either a heat-curable resin or a thermoplastic resin is applicable. From the standpoint of ease of combining with the glass, a thermoplastic resin is preferred and a resin having an acid group and an amino group is preferred. The resin having an acid group and an amino group readily forms chemical bonds with the low-melting-point glass of the present invention.

Examples of the heat-curable resin include epoxy resins, phenolic resins, urea resins, melamine resins, silicone resins, unsaturated polyester resins, and polyurethane resins.

Examples of the thermoplastic resin include nylons, polyacetals, polysulfones, polyetherimides, poly(amide-imide)s, liquid-crystal polymers, polytetrafluoroethylene, polychlorotrifluoroethylene, poly(vinylidene fluoride), aromatic polyethers, poly(phenylene ether)s, polyetheretherketones, poly(phenylene oxide)s, polycarbonates, polyethylene, poly (ethylene terephthalate), poly(butylene terephthalate), poly (ethylene naphthalate), polyethersulfones, polypropylene, polystyrene, acrylonitrile/butadiene/styrene, acrylics, poly (vinyl chloride), polyarylates, polyoxybenzoyl polyesters, cycloolefin polymers, and cycloolefin copolymers.

From the standpoint of ease of combining with the glass, the glass and the resin preferably have approximately the same viscosity at temperatures within a molding-temperature range. Specifically, the resin preferably has a complex viscosity of 250-1,000 Pa·s at a temperature where the glass has a complex viscosity of 500 Pa·s.

Methods for producing the glass-resin-composite pellet is not particularly limited. Examples thereof include: a method in which a glass ingredient and a resin ingredient are melt-kneaded with a twin-screw kneader/extruder or the like optionally together with other ingredients and the resultant melt is pelletized; and a method in which a glass pellet and a resin pellet are thermally press-bonded.

In the glass-resin-composite pellet of the present invention, the glass-resin mixing ratio is not particularly limited and can be suitably set in view of uses of the composite composition, etc. For example, the glass and the resin can be mixed and combined in a glass-resin ratio in a range of 1/99 to 99/1 (by volume).

<<Other Components>>

The glass pellet according to the present invention may contain one or more of fillers, additives, etc. according to need. The fillers may be platy fillers, spherical fillers, or other particular fillers. The fillers may be inorganic fillers or organic fillers. Examples of the additives include flame retardants, conductivity-imparting agents, nucleators, ultraviolet absorbers, antioxidants, damping agents, antibacterials, insecticides, deodorants, coloring inhibitors, heat stabilizers, release agents, antistatic agents, plasticizers, lubricants, colorants, pigments, dyes, foam inhibitors, viscosity modifiers, and surfactants.

<Molded Object>

The molded object according to the present invention includes the glass according to the present invention and is obtained by forming the glass pellet (either a pellet made of the glass alone or the glass-resin-composite pellet) into a desired shape by low-temperature molding, e.g., extrusion, injection, blow, or press molding. If glasses crystallize or foam when molded, not only the molding is difficult but also the molded objects are deprived of transparency. Since the glass of the present invention is inhibited from crystallizing or foaming when molded, molded objects excellent in terms of bonding strength in the composite with resin and of transparency are obtained. From the standpoint of ensuring transparency, the molded object according to the present has an average value of preferably 60% or higher, more preferably 70% or higher, still more preferably 80% or higher in thickness-direction parallel-light transmittance in a wavelength of 400-700 nm. Although there is no particular upper limit on the parallel-light transmittance, the average value thereof is typically 92% or less. From the standpoint of ensuring transparency, the molded object according to the present invention has a thickness-direction haze ratio of preferably 20% or less, more preferably 15% or less, still more preferably 10% or less. Although there is no particular lower limit on the haze ratio, the haze ratio is typically 0.2% or higher.

The molded object according to the present invention preferably has satisfactory gas barrier property. Specifically, under the conditions of 40° C. and 90% RH, the molded object has a water vapor permeability of preferably 1 $g/m^2$/day or less, more preferably 0.1 $g/m^2$/day or less, still more preferably 0.01 $g/m^2$/day or less, especially preferably 0.001 $g/m^2$/day or less.

Examples of the constitution of the molded object according to the present invention include a molded glass object and a molded glass-resin-composite object. The molded object may have a platy or filmy shape. The molded object may have a three-dimensional shape such as a hollow or solid cylinder, a prism, a bottle, a syringe, or a container. In the case of a platy or filmy shape, this shape is not limited to rectangles and may be a polygon, a circle, or an ellipse. The surface may be smooth or have irregularities.

The molded object is not particularly limited in its thickness. However, the thickness thereof is preferably 0.01-5 mm, more preferably 0.02-3 mm, still more preferably 0.05-1 mm. In the case where the thickness of the molded object is 0.01 mm or larger, the molded object can have improved strength and improved gas barrier property. In the case where the thickness of the molded object is 5 mm or less, a weight reduction can be attained.

<<Molded Glass-Resin-Composite Object>>

Examples of the molded glass-resin-composite object include 1) a glass-resin laminate and 2) a glass-resin sea-island composite. If the glass ingredient crystallizes or foams, not only low-temperature molding for producing molded composite objects is difficult but also the obtained molded objects are reduced in bonding strength between resin and glass and reduced in transparency. Since the glass of the present invention is inhibited from crystallizing or foaming during low-temperature molding, molded objects excellent in terms of bonding strength in the composite with resin and of transparency are obtained. From the standpoint of ensuring transparency, the molded object has an average value of preferably 60% or higher in thickness-direction parallel-light transmittance in a wavelength of 400-700 nm, more preferably 70% or higher, still more preferably 80% or higher. Although there is no particular upper limit on the parallel-light transmittance, the average value thereof is typically 92% or less.

1) Glass-Resin Laminate

Figure 1A:
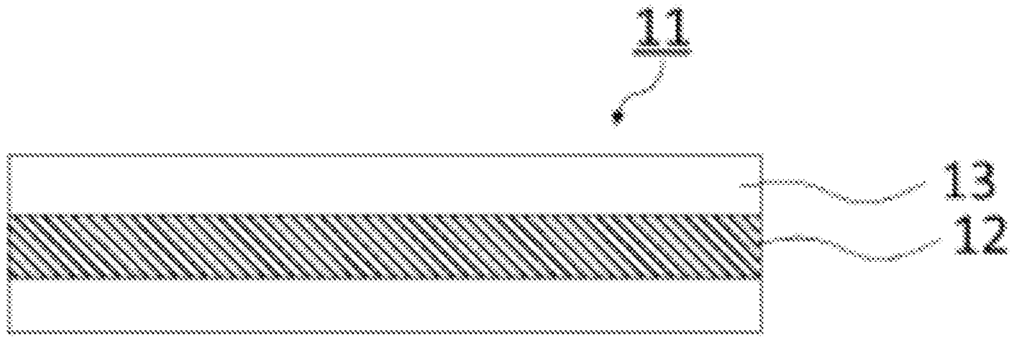
FIG. 1B is a schematic cross-sectional view of an embodiment of a glass-resin laminate.
FIG. 1C is a schematic cross-sectional view of an embodiment of a glass-resin sea-island composite.
Figure 1B:
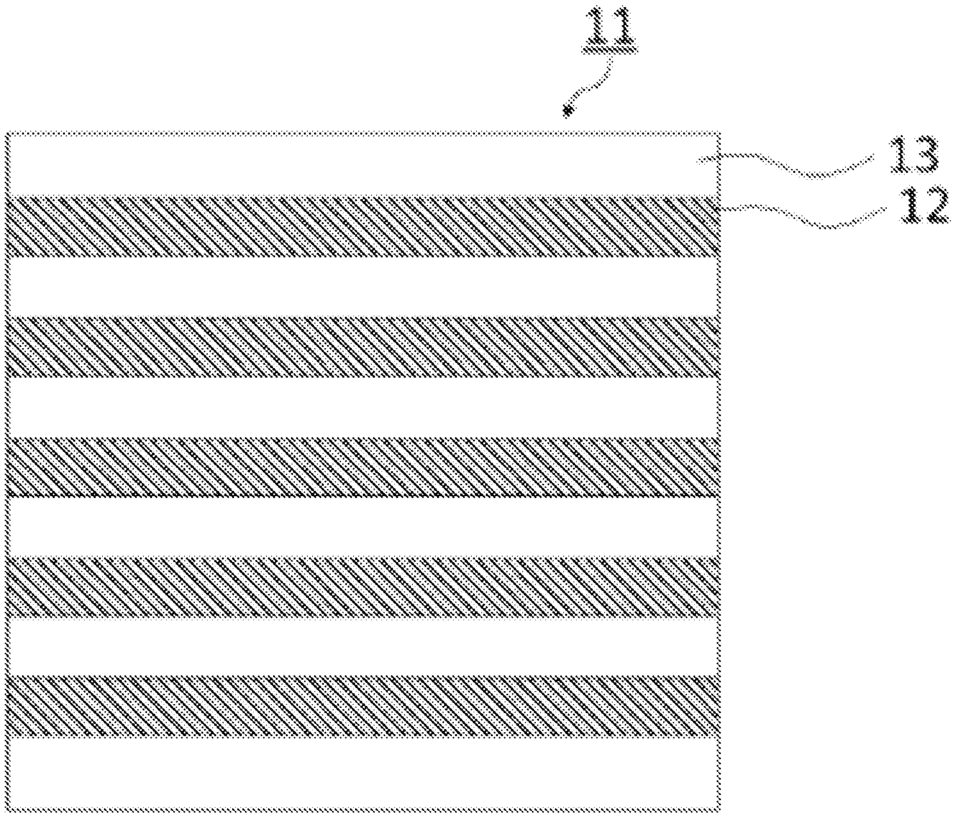

In each of FIG. 1A and FIG. 1B is illustrated a schematic cross-sectional view of an embodiment of the glass-resin laminate. As illustrated in each of FIG. 1A and FIG. 1B, the glass-resin laminate 11 is a laminate of two or more layers, which includes a glass layer 12 and a resin layer 13 laminated on one or both surface of the glass layer 12. The glass-resin laminate 11 is preferably a laminate of three of more layers. From the standpoints of moldability and strength, the outermost layers are preferably resin layers.

The content ratio (volume ratio) between the glass layer (s) and the resin layer(s) in the glass-resin laminate is preferably 0.1:99.9 to 80:20, more preferably 10:90 to 60:40, from the standpoints of gas barrier property and weight reduction.

The glass-resin laminate is obtained by separately melting a glass ingredient (e.g., the glass pellet) and a resin ingredient (e.g., a resin pellet), subsequently stacking layers of the melts to combine these, and molding the stacked layers at a low temperature by extrusion molding, injection molding, blow molding, press molding, or the like.

2) Glass-Resin Sea-Island Composite

Figure 1C:
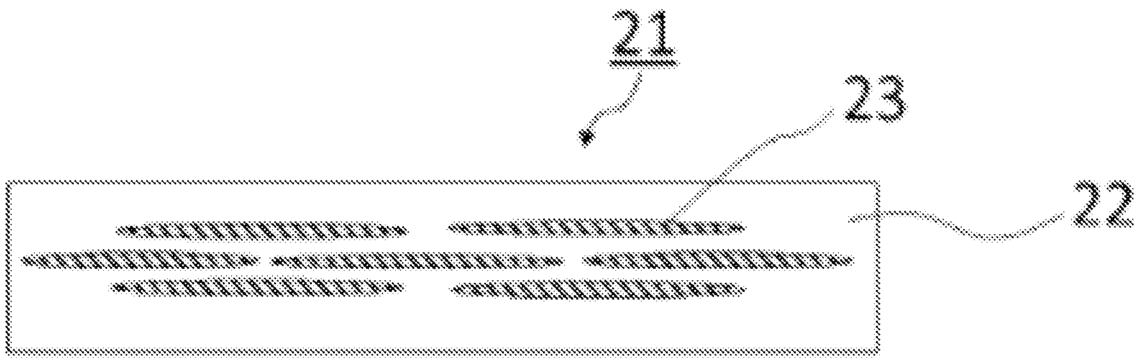

In FIG. 1C is illustrated a schematic cross-sectional view of an embodiment of the glass-resin sea-island composite. As illustrated in FIG. 1C, the glass-resin sea-island composite 21 has a structure in which a particulate discontinuous glass phase 23 having a closed interface is dispersed in a resin phase 22 that is a continuous phase made of resin. Although the schematic cross-sectional view of FIG. 1C illustrates a glass-resin sea-island composite consisting of one layer, the glass-resin sea-island composite may have a structure composed of two or more layers. From the standpoints of moldability and strength, the outermost layers are preferably resin layers.

In this specification, the term "sea-island structure" means a structure in which a discontinuous phase made of a component constituting an island phase, that has the shape of particles each having a closed interface (interface of a phase and a phase), is present in a continuous phase made of a component constituting a sea phase.

The content ratio (volume ratio) between the glass phase and the resin phase in the glass-resin sea-island composite is preferably 1:99 to 70:30, more preferably 10:90 to 60:40, from the standpoints of gas barrier property and weight reduction.

Examples of methods for producing the glass-resin sea-island composite include a method in which a material (e.g., the glass-resin-composite pellet) obtained by mixing and combining a glass ingredient (e.g., the glass pellet) with a resin ingredient (e.g., a resin pellet) and a resin ingredient (e.g., a resin pellet) are separately melted, and the resultant melts are stacked and combined, and subsequently subjected to low-temperature molding by extrusion molding, injection molding, blow molding, press molding, etc. and then to biaxial stretching.

In FIG. 2 are illustrated schematic views of an embodiment of processes for producing a glass-resin sea-island composite. (A) of FIG. 2 illustrates a laminating step. In the laminating step, a resin layer 27 is laminated to both surfaces of a layer 26 obtained by combining a glass ingredient 24 with a resin ingredient 25, thereby obtaining a laminate 28. (B) of FIG. 2 illustrates a stretching and drawing step. In the stretching and drawing step, the laminate obtained in the laminating step is stretched and drawn by biaxial stretching. Thus, the glass-resin sea-island composite illustrated in (C) of FIG. 2 is obtained.

<Uses>

The molded object according to the present invention is excellent in terms of transparency and barrier property, and examples of uses thereof include packagings of foods, e.g., highly functional foods, or medicines, medicine containers or vessels, such as syringes and ampuls, and high-frequency films/substrates for use in flexible displays, wearable devices, cell phones, or 5G communication systems of, e.g., organic field-effect transistor (OLET) covers.

The present invention is explained in detail below by reference to Examples, but the present invention is not limited to the following Examples.

EXAMPLES

The present invention is explained below by reference to Examples, but the present invention is not limited thereby.

<Production of Glasses>

In accordance with each of the following base glass compositions, raw materials for glass were weighed out and then melted, and the melt was cast into a die to obtain a glass block. Base glass composition for Examples 1 to 6: a composition including, as represented by mol %, 15% of P, 17.5% of Sn, 42.5% of O, and 25% of F. Base glass composition for Example 7: a composition including, as represented by mol %, 15.4% of P, 15.4% of Sn, 38.5% of O, and 30.7% of F. Base glass composition for Example 8: a composition including, as represented by mol %, 18.2% of P, 12.1% of Sn, 45.5% O, and 24.2% of F.

One type or two types in P raw materials were selected from among $NH_4H_2PO_4$, $Sn_2P_2O_7$, and $H_3PO_4$ (85% of concentration) and weighed out. In the case of using $H_3PO_4$, it was dried at a given temperature for 4 hours. Thereafter, the one or two types were mixed with the other raw materials, such as SnO and $SnF_2$, and the mixture was melted at 500° C. for 2 hours using a platinum crucible. The melt was cast into a die to obtain a glass block. The obtained glass was examined to determine the concentration of F by an ion selective electrode method and determine the concentration of each of the elements other than F and O by ICP emission spectrophotometry. The concentration of O was calculated from a difference between the total concentration of the other elements and the whole. The results of the composition determination are shown in Table 1 as represented by mol % based on elements.

<Evaluation>

(Tx, Tg, Tc)

The glass block was pulverized with an agate mortar to obtain a powder having a median diameter of 0.3 μm. A 50-mg portion of the powder was weighed out and put on an aluminum pan, and examined with a differential scanning calorimeter (DSC 3300SA, manufactured by Bruker GmbH) in the air atmosphere under the conditions of heating from 25° C. to 500° C. at 2° C./min. In a DSC curve, the Tg is a temperature at which the curve undergoes an endothermic shift first in the course of heating, the Tx is a temperature at which heat generation due to crystallization begins first in the course of heating, and the Tc is a temperature corresponding to a peak of the heat generation due to crystallization occurring first in the course of heating. In the case where the Tx or the Tc was not observed, this is indicated by "none".

(Weight Change at (Tg+150)° C.)

The glass block was pulverized with an agate mortar to obtain a powder having a median diameter of 0.3 μm. A 50-mg portion of the powder was weighed out and put on an aluminum pan, and examined with a thermogravimetric differential thermal analyzer (TG-DTA 20000SA, manufactured by Bruker GmbH) in the air atmosphere under such conditions that the powder was heated from 25° C. to (Tg+150)° C. at 2° C./min and then held at (Tg+150)° C. for 1 hour. The powder was evaluated for the ratio of the resultant weight change with respect to the initial weight.

(Infrared Absorption Spectrum)

The glass block was processed into a flat plate having a thickness of 1 mm using free abrasive grains of cerium oxide as a finishing material and then examined with a Fourier transform infrared spectrophotometer (Nicolet iS10, manufactured by Thermo Scientific) in the wavenumber range of 400-4,000 $cm^{-1}$. The transmittance at a wavenumber of 400 $cm^{-1}$ was expressed by T400, the transmittance at a wavenumber of 3,100 $cm^{-1}$ was expressed by T3100, and the transmittance at a wavenumber of 3,240 $cm^{-1}$ was expressed by T3240. Then the absorbance A3100 per 1-mm thickness at a wavenumber of 3,100 $cm^{-1}$ was calculated by $A3100=-\log_{10}(T3100/T400)$ and the absorbance A3240 per 1-mm thickness at a wavenumber of 3,240 $cm^{-1}$ was calculated by $A3240=-\log_{10}(T3240/T400)$.

(Parallel-Light Transmittance)

The glass block was processed into a flat plate having a thickness of 1 mm using free abrasive grains of cerium oxide as a finishing material and then examined with a spectrophotometer for ultraviolet, visible, and near-infrared regions (U4100, manufactured by Hitachi High-Technologies Corp.) to acquire parallel-light transmittances in a wavelength of 400-700 nm.

The results are shown in Table 1. In Table 1, Examples 1 and 2 are Comparative Examples, and Examples 3 to 8 are Inventive Examples.

TABLE 1

| | Example 1 | Example 2 | Example 3 | Example 4 |
|---|---|---|---|---|
| Raw materials used (Weight ratio of each phosphoric-acid-salt raw material to sum of all phosphoric-acid-salt raw materials) | $NH_4H_2PO_4$ (100%) SnO $SnF_2$ | $Sn_2P_2O_7$ (47%) $NH_4H_2PO_4$ (53%) $SnF_2$ | $H_3PO_4$ (100%) SnO $SnF_2$ | $Sn_2P_2O_7$ (47%) $H_3PO_4$ (53%) $SnF_2$ |
| Drying temperature (° C.) | no drying | no drying | 170 | 150 |
| P (mol %) | 15.8 | 14.4 | 16.2 | 14.0 |
| Sn (mol %) | 18.8 | 17.9 | 19.0 | 17.3 |
| O (mol %) | 47.8 | 63.2 | 55.9 | 64.4 |
| F (mol %) | 17.6 | 4.5 | 8.9 | 4.4 |
| Tg (° C.) | 130.3 | 122.2 | 98.5 | 120.8 |
| Tx (° C.) | 263.5 | 240.5 | 247.7 | 264.7 |
| Tc (° C.) | 275.6 | 259 | 267.6 | 279.6 |
| Tx − Tg (° C.) | 133.2 | 118.3 | 149.2 | 143.9 |
| Tc − Tg (° C.) | 145.3 | 136.8 | 169.1 | 158.8 |
| Ratio of weight change (%) | −0.86 | −0.74 | −0.76 | −0.94 |
| A3100 | 2.69 | 3.01 | 2.34 | 3.25 |
| A3240 | 3.74 | 5.20 | 2.35 | 2.66 |
| A3240/A3100 | 1.39 | 1.73 | 1.00 | 0.82 |
| Parallel-light transmittance (%) | 36.5 | 59.7 | 86.1 | 72.5 |

| | Example 5 | Example 6 | Example 7 | Example 8 |
|---|---|---|---|---|
| Raw materials used (Weight ratio of each phosphoric-acid-salt raw material to sum of all phosphoric-acid-salt raw materials) | $H_3PO_4$ (100%) SnO $SnF_2$ | $H_3PO_4$ (100%) SnO $SnF_2$ | $H_3PO_4$ (100%) $SnF_2$ | $H_3PO_4$ (100%) $SnF_2$ |
| Drying temperature (° C.) | 400 | 150 | 170 | 170 |
| P (mol %) | 16.0 | 15.3 | 14.7 | 17.6 |
| Sn (mol %) | 18.8 | 17.6 | 14.7 | 12.0 |
| O (mol %) | 56.4 | 64.2 | 61.9 | 62.3 |
| F (mol %) | 8.8 | 3.0 | 8.7 | 8.1 |
| Tg (° C.) | 105.6 | 126.3 | 98.5 | 128.5 |
| Tx (° C.) | none | 294.1 | 255.0 | none |
| Tc (° C.) | none | 306.3 | 267.8 | none |
| Tx − Tg (° C.) | none | 167.8 | 156.5 | none |
| Tc − Tg (° C.) | none | 180.0 | 169.3 | none |
| Ratio of weight change (%) | −0.60 | −0.60 | −0.95 | −0.07 |
| A3100 | 1.12 | 1.26 | 0.52 | 1.15 |
| A3240 | 0.99 | 1.12 | 0.48 | 1.16 |
| A3240/A3100 | 0.88 | 0.85 | 0.92 | 1.01 |
| Parallel-light transmittance (%) | 75.2 | 88.3 | 88.1 | 89.5 |

The results of the examination of the glasses of Examples 1 and 5 for infrared absorption spectrum are shown in FIG. 4 as examples.

The results of the examination of the glasses of Examples 1 and 3 for parallel-light transmittance are shown in FIG. 5 as examples.

As shown in Table 1, in Examples 3 to 8, which are Inventive Examples of the present invention, transparent glasses were obtained since each glass had A3240/A3100 of 1.2 or less to be reduced in water content and be less apt to crystallize. The glasses obtained in Examples 3 to 6 had better transparency despite the low-temperature molding because the difference between the Tc and the Tg was 150° C. or larger (or no Tc was observed) to attain a widened margin between the temperature at which the glass became moldable and the crystallization temperature. Meanwhile, in Examples 1 and 2, which are Comparative Examples, transparent glasses were unable to be obtained since each A3240/A3100 was larger than 1.2 and crystallization was not controlled.

<Production of Glass-Resin Composites>

The glass produced in Example 3 was processed into a plate shape having a thickness of 2 mm and sandwiched between two poly(ethylene terephthalate) resins having a thickness of 0.3 mm, and this stack was press-molded at 260° C., thereby producing a composite. As a result, the bonding strength between the glass and the resin was satisfactory, and the composite had an high average value of 75% in thickness-direction parallel-light transmittance in a wavelength of 400-700 nm and was transparent.

Meanwhile, the glass produced in Example 1 was processed into a plate shape having a thickness of 2 mm and sandwiched between two poly(ethylene terephthalate) resins having a thickness of 0.3 mm, and this stack was press-molded at 260° C., thereby producing a composite. As a result, the bonding strength between the glass and the resin was satisfactory, but the composite had an low average value of 45% in thickness-direction parallel-light transmittance in a wavelength of 400-700 nm due to crystallization and was not transparent.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 4, 2020 (Application No. 2020-149137), the entire contents thereof being incorporated herein by reference. All the references cited here are incorporated herein as a whole.

What is claimed is:

1. A glass comprising, as represented by mol % based on elements:

8-25% of P;

8-40% of Sn;

20-80% of O; and 1-50% of F, wherein the glass has a glass transition temperature Tg of 300° C. or lower, the glass gives an infrared absorption spectrum satisfying A3240/A3100 of 0.6-1.2, where the A3100 is an absorbance per 1-mm thickness at a wavenumber of 3,100 $cm^{-1}$ and the A3240 is an absorbance per 1-mm thickness at a wavenumber of 3,240 $cm^{-1}$, and a difference between a crystallization peak temperature Tc by differential scanning calorimetry and the glass transition temperature Tg is 150° C. or larger.

2. The glass according to claim 1, wherein the A3100 is 0.2-4 and the A3240 is 0.12-4.8.

3. The glass according to claim 1, having a weight change of −2% to +0.5% through a 1-hour heat treatment at (Tg+150)° C.

4. The glass according to claim 1, having an average value of 70% or higher in parallel-light transmittance in a wavelength of 400-700 nm through a flat plate having a thickness of 1 mm.

5. The glass according to claim 1, wherein the glass is suitable for at least one of extrusion molding, injection molding, blow molding, and press molding, at 450° C. or lower.

6. A pellet comprising the glass according to claim 1, and having a major-axis length of 0.1 mm to 5 mm.

7. The pellet according to claim 6, having a minor-axis length of 0.1 mm to 5 mm and a ratio between the major-axis length and the minor-axis length of 0.2-1.

8. The pellet according to claim 6, being a glass pellet.

9. The pellet according to claim 6, being a glass-resin-composite pellet obtained by combining the glass with a resin.

10. A molded object comprising a glass, the molded object being obtained by molding the pellet according to claim 6.

11. The molded object according to claim 10, being a molded glass-resin-composite object.

12. The molded object according to claim 10, having an average value of 60% or higher in thickness-direction parallel-light transmittance, in a wavelength of 400-700 nm through a thickness of 1 mm.

13. The glass according to claim 2, wherein the A3100 is 0.2-4 and the A3240 is 0.12-4.8.

14. The glass according to claim 2, having a weight change of −2% to +0.5% through a 1-hour heat treatment at (Tg+150)° C.

15. The glass according to claim 2, having an average value of 70% or higher in parallel-light transmittance in a wavelength of 400-700 nm through a flat plate having a thickness of 1 mm.

16. The glass according to claim 2, wherein the glass is suitable for at least one of extrusion molding, injection molding, blow molding, and press molding, at 450° C. or lower.

17. A pellet comprising the glass according to claim 2, and having a major-axis length of 0.1 mm to 5 mm.

18. The pellet according to claim 2, having a minor-axis length of 0.1 mm to 5 mm and a ratio between the major-axis length and the minor-axis length of 0.2-1.

19. The glass according to claim 3, having an average value of 70% or higher in parallel-light transmittance in a wavelength of 400-700 nm through a flat plate having a thickness of 1 mm.

* * * * *